United States Patent
Lanzinger et al.

(10) Patent No.: US 7,165,385 B2
(45) Date of Patent: Jan. 23, 2007

(54) REEL FOR A CROP HARVESTING DEVICE

(75) Inventors: Bernhard Lanzinger, Langenpreising (DE); Dirk Weichholdt, Sarreguemines (FR); Martin Büermann, Hornbach (DE); Arjan Berendsen, Aj Lengel (NL)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/123,625

(22) Filed: May 6, 2005

(65) Prior Publication Data

US 2005/0252188 A1    Nov. 17, 2005

(30) Foreign Application Priority Data

May 5, 2004    (DE)    ............ 10 2004 022 196

(51) Int. Cl.
*A01D 57/00*    (2006.01)
(52) U.S. Cl. .................................................. 56/220
(58) Field of Classification Search .................. 56/220, 56/219, 221, 222, 223, 224, 225, 226, 227, 56/344, 345, 350, 351, 354, 364–367, 375–380, 56/384
See application file for complete search history.

(56) References Cited

U.S. PATENT DOCUMENTS

| | | | |
|---|---|---|---|
| 47,338 A | 4/1865 | Russell | |
| 686,823 A | 11/1901 | Macphail | |
| 758,241 A * | 4/1904 | Friend et al. | 56/227 |
| 1,123,949 A | 1/1915 | Sturrock | |
| 2,024,735 A | 12/1935 | Hume et al. | 56/220 |
| 2,102,709 A | 12/1937 | Hume et al. | 56/220 |
| 2,212,878 A * | 8/1940 | Hume et al. | 56/226 |
| 2,431,397 A * | 11/1947 | Harrison | 56/226 |
| 2,610,460 A | 9/1952 | Hendrickson | 56/220 |
| 2,644,289 A * | 7/1953 | Hume | 56/226 |
| 2,795,921 A * | 6/1957 | Hume | 56/226 |
| 3,145,520 A * | 8/1964 | Hume et al. | 56/220 |
| 3,468,109 A | 9/1969 | Reimer | 56/220 |
| 3,771,299 A | 11/1973 | Gradwohl et al. | 56/220 |
| 4,016,710 A | 4/1977 | May et al. | 56/220 |
| 6,978,589 B1 * | 12/2005 | Lanzinger | 56/220 |

* cited by examiner

*Primary Examiner*—Árpád Fábián Kovács

(57) ABSTRACT

This invention refers to a real for a crop harvesting device. The reel has tine carriers extending over the width of the reel carrying tines for feeding crop, and links for supporting the tine carriers. The links are mounted to the tine carriers by link holders. The link holders each include two support halves which are movably with respect to each other. The support halves enclose a tine carrier and each have a link holding part. The link holding parts of both support halves are commonly surrounded by the link such that the support halves are fixed to each other by the link.

10 Claims, 4 Drawing Sheets

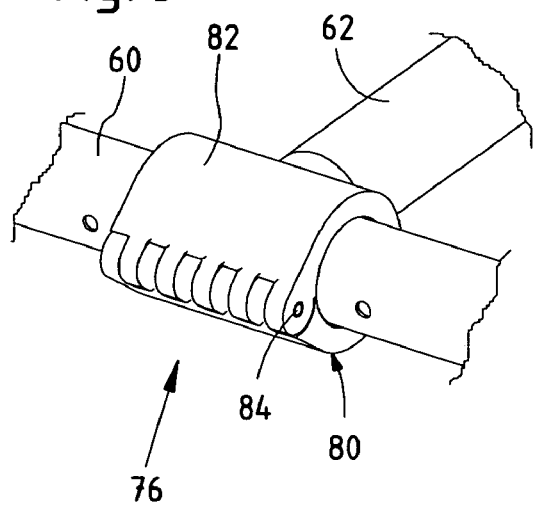
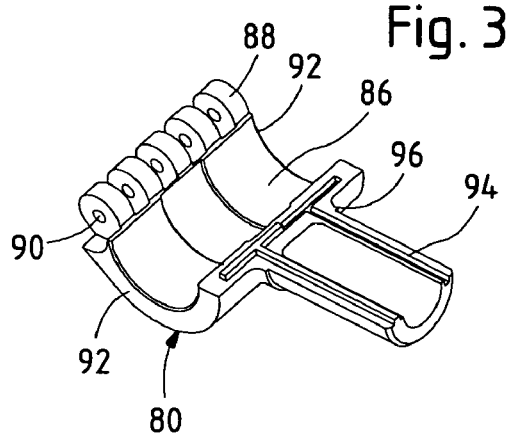
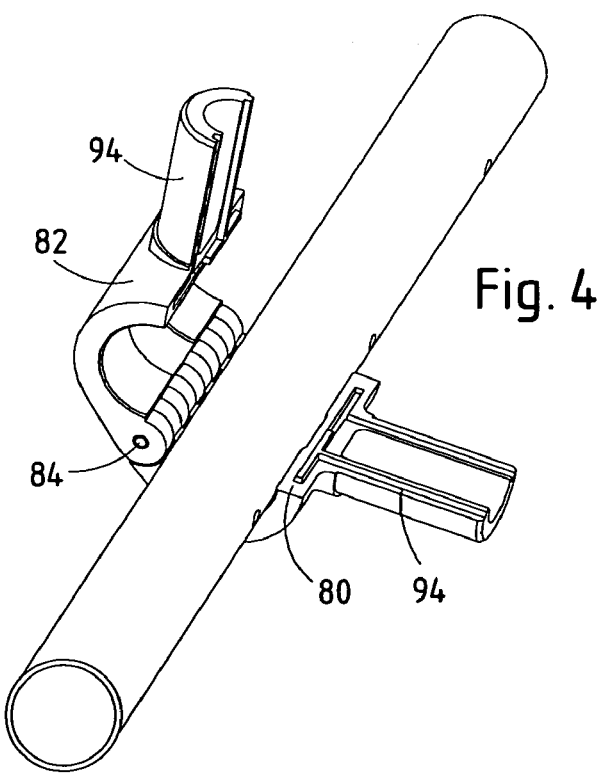

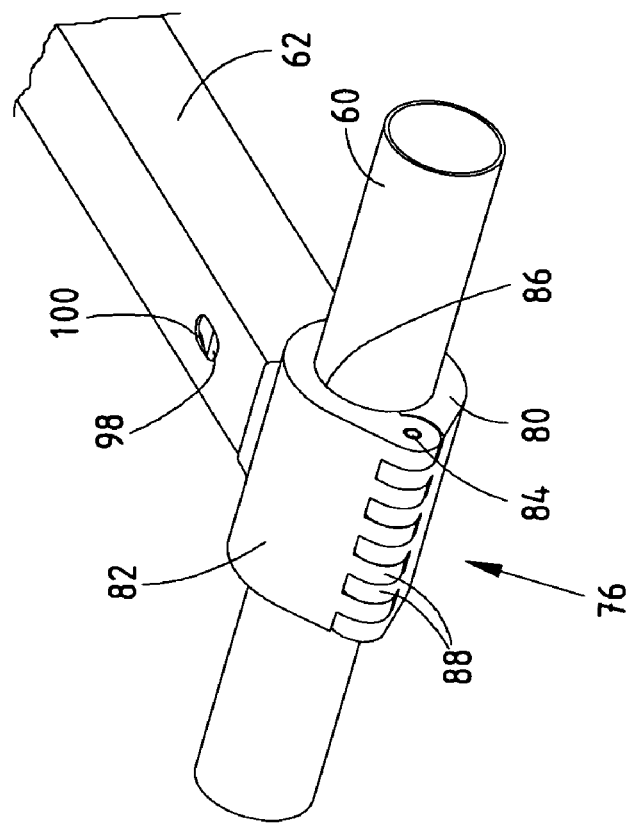
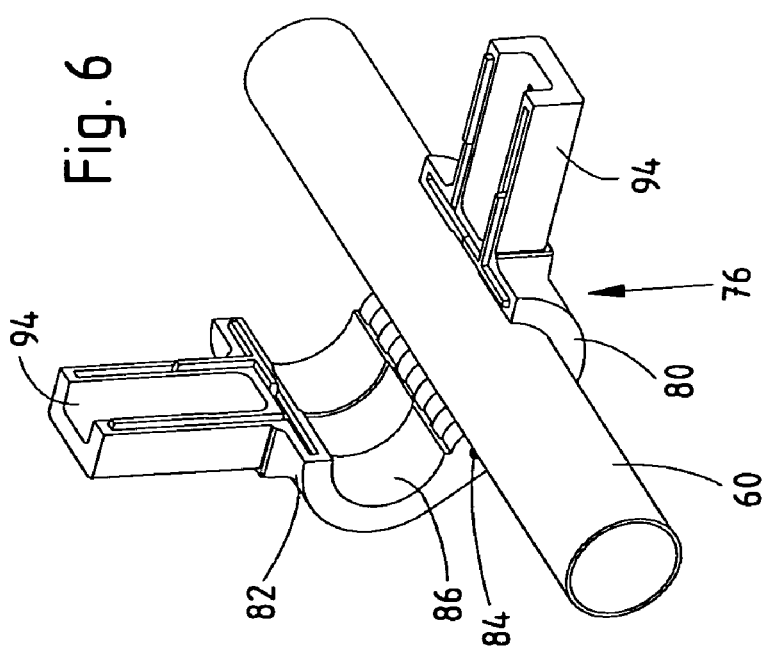

REEL FOR A CROP HARVESTING DEVICE

FIELD OF THE INVENTION

This invention pertains to a reel for a crop harvesting device with tine carriers extending across the width of the reel. The reel carries tines for feeding crop and has support links for supporting the tine carrier. The links are fastened to the tine carrier by link holders.

BACKGROUND OF THE INVENTION

Reels are used in crop harvesting devices, particularly in cutters, to feed standing crop material to a cutter bar and a cross-feed device. They have a number of tine carriers (usually six) that extend over the width of the crop harvesting device and carry a plurality of tines. The tine carriers are rotatably seated at their ends on spiders and are usually provided with an angle control. The angle control successively varies the angle of the tine carrier relative to the spider as the spider rotates about a central horizontal axis that is transverse to the direction of travel. Additional support elements between the spiders enhance the stability of the tine carriers. In known reel embodiments, the support elements extend in a star shape from a central carrier tube outwards to the tine carriers. Other embodiments also disclose structure in which adjacent carrier rods were directly connected to one another by support links, such as U.S. Pat. No. 2,024,735, U.S. Pat. No. 2,102,709 and U.S. Pat. No. 3,468,109.

For connection between the support element and the tine carrier or the transverse elements of the reel interacting with the crop, various embodiments have been described. In U.S. Pat. No. 47,338, U.S. Pat. No. 2,024,735, U.S. Pat. No. 2,102,709, U.S. Pat. No. 3,771,299 and U.S. Pat. No. 4,016,710, a U-shaped bracket that surrounds the transverse element is used. A clamp that contacts the transverse element on three sides is described in U.S. Pat. No. 2,610,460. In all embodiments, it is necessary to disassemble the support element for repair. A considerable amount of time is necessary, since usually a threaded fastener must be taken off before the bracket or clamp can be removed.

In U.S. Pat. No. 686,823, connectors between the support element and the center carrier tube are furnished with spring elements and automatically engage during assembly. In U.S. Pat. No. 1,123,949 a bolt serves to fasten the support element to the carrier tube. These connections require a flange on the center carrier tube, which, however, is not available on the tine carrier.

In a related patent application by the assignee of the present application, DE 10 2004 001 383 A to be published subsequently, a reel without a central carrier tube is described. The tine carriers are connected to one another by links that form a supporting latticework.

SUMMARY OF THE INVENTION

The present invention provides a reel, without a central carrier tube, that can easily be installed and removed.

The link holders are constructed of two support halves. The support halves accommodate the tine carrier between them and are therefore provided with a suitable bearing surface. The support halves are movable with respect to one another, more particularly, pivotable or separable from and fixable to one another on the side facing away from the link holding section. This movement allows placing them on the tine carrier or removing them from it in the opened state. They enclose the tine carrier in the closed state. Each of the two support halves has a link holding section. In the assembled state, the link surrounds the two link holding sections and fixes them to one another. The link can connect the tine carrier to another tine carrier or to a central carrier tube of the reel, when such a carrier tube is present. Thus a reel can be put together and disassembled easily and preferably even without tools.

It is desirable to lock the link on the link holder. Thus a spring tongue can be arranged on one link holding section. The spring tongue engages in a suitable opening of the other link section in the assembled state and fixes the axial orientation of the link.

The link is fixed in the azimuthal direction. Thus protection against rotation or twisting about the longitudinal axis of the link is achieved by a noncircular inside cross section of the link and a noncircular outside cross section of the link holding sections. The cross sections can also be, for example, oval, rectangular, square, hexagonal or octagonal.

In a preferred embodiment, the tine carriers rotate with respect to the link holders in order to adapt the orientation of the fingers to the respective position of the tine carrier. In this embodiment, the link holder is secured in the longitudinal direction of the tine carrier against displacement. Suitable holders can be jointly fixed to the tine carrier with adjacent fingers. If the tine carrier is not supposed to rotate with respect to the link holders, they can be fixed to the tine carrier and secured in an arbitrary manner against rotation.

In the preferred embodiment of the invention, the link holders each hold only one link. With appropriate construction, however, it is possible to combine two link holders (leading to the adjacent tine carriers) or three link holders (leading to the adjacent tine carriers and to a central carrier tube) in a single link mount. Thus, the stability of the reel would be further increased. The link mount could also be constructed of several bearing halves or elements which are each held together in the area of their link holding sections by the link placed on them.

BRIEF DESCRIPTION OF THE DRAWINGS

FIG. 3 is a perspective view of a first support half of a link holder;

FIG. 4 is a perspective view of the first support half of the link holder with a second support half positioned on a tine carrier;

FIG. 5 is a perspective view of the link holder with a link connected to the tine carrier;

FIG. 6 is a perspective view of a second embodiment of the link holder, positioned on the tine carrier; and FIG. 7 is a perspective view of the second embodiment of the link holder, with an attached link.

DETAILED DESCRIPTION

Figure 1:
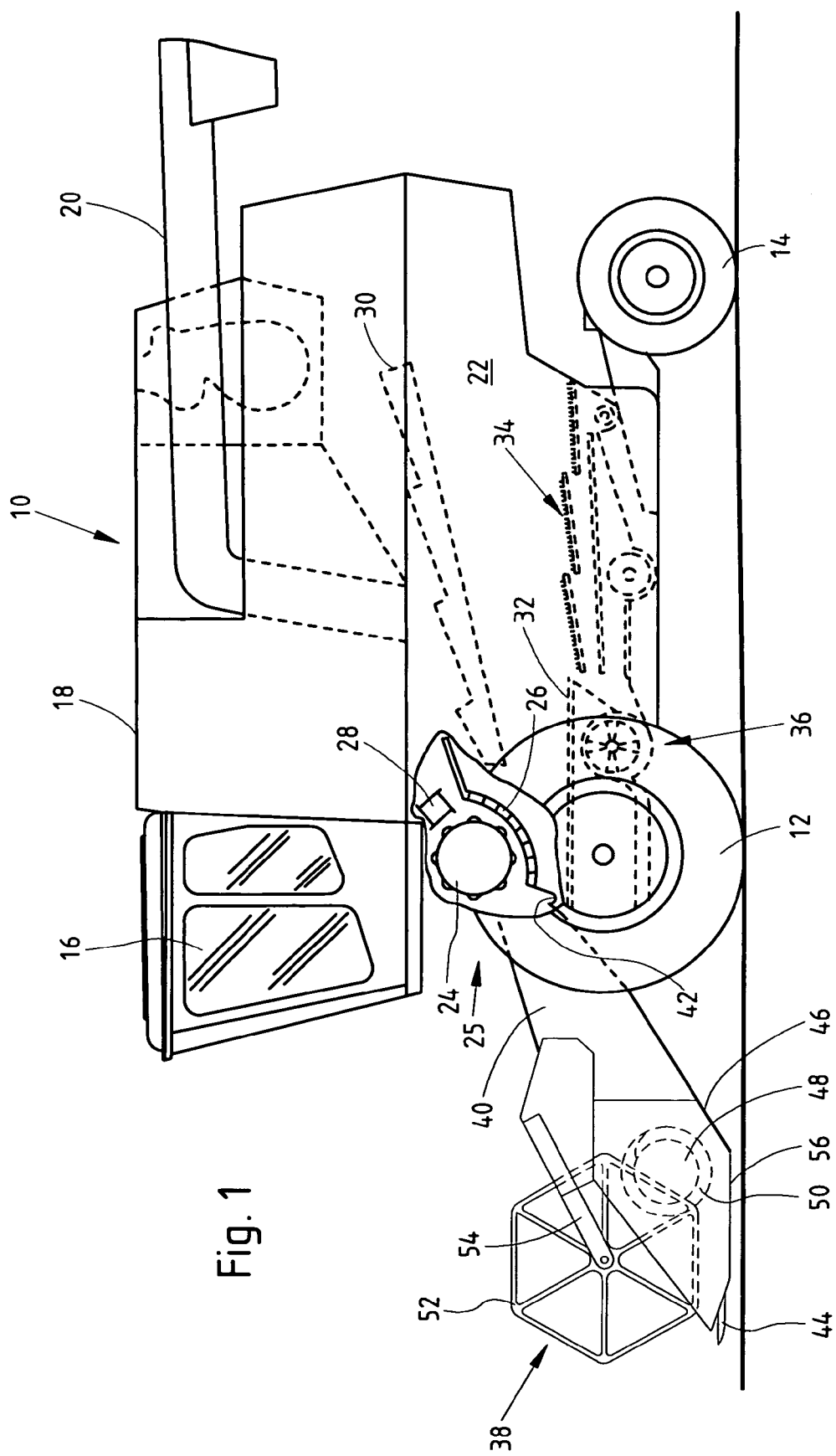
FIG. 1 discloses a combine with a crop harvesting attachment having a reel.

A combine 10 is shown in FIG. 1 and is supported on front driven and rear steerable wheels 12 and 14, respectively, and includes an operator's cab 16 from which it can be operated by a driver. A grain tank 18 is adjacent the operator's cab 16 at the rear. An unloading auger 20 can discharge the grain the tank holds to another container. A crop processing unit 25 is mounted on a frame 22, in which the harvested crop is processed into its large and small components by a threshing drum 24, a threshing basket 26 and a turning drum 28. A further separation of the harvested crop is carried out on the adjoining straw shakers 30, as well as on a preparation base 32 and screens 34. The threshed, clean grain portion is conveyed into grain tank 18. The coarse crop material other than grain is deposited onto the ground by the straw shakers 30 and the light components are blown to the ground from screens 34 by a fan 36. The cut crop material is picked up by a crop harvesting device 38 and fed to threshing drum 24 via the feederhouse 40, which is an inclined conveyor with a stone trap 42.

In the illustrated embodiment, crop harvesting device 38 is a mower mechanism having a reciprocating cutter bar 44 at the front edge. The frame 46 of the crop harvesting device 38 also supports an auger or screw conveyor 48 with convolutions 50 running around a central tube. A reel 52 is positioned above and in front of the screw conveyor 48. The reel 52 feeds standing crop material to cutter bar 44 and screw conveyor 48. Reel 52 is connected to frame 46 at both ends by reel support arms 54 and is driven about its longitudinal axis by a mechanical or hydraulic drive unit such that it rotates counterclockwise in FIG. 1.

Figure 2:
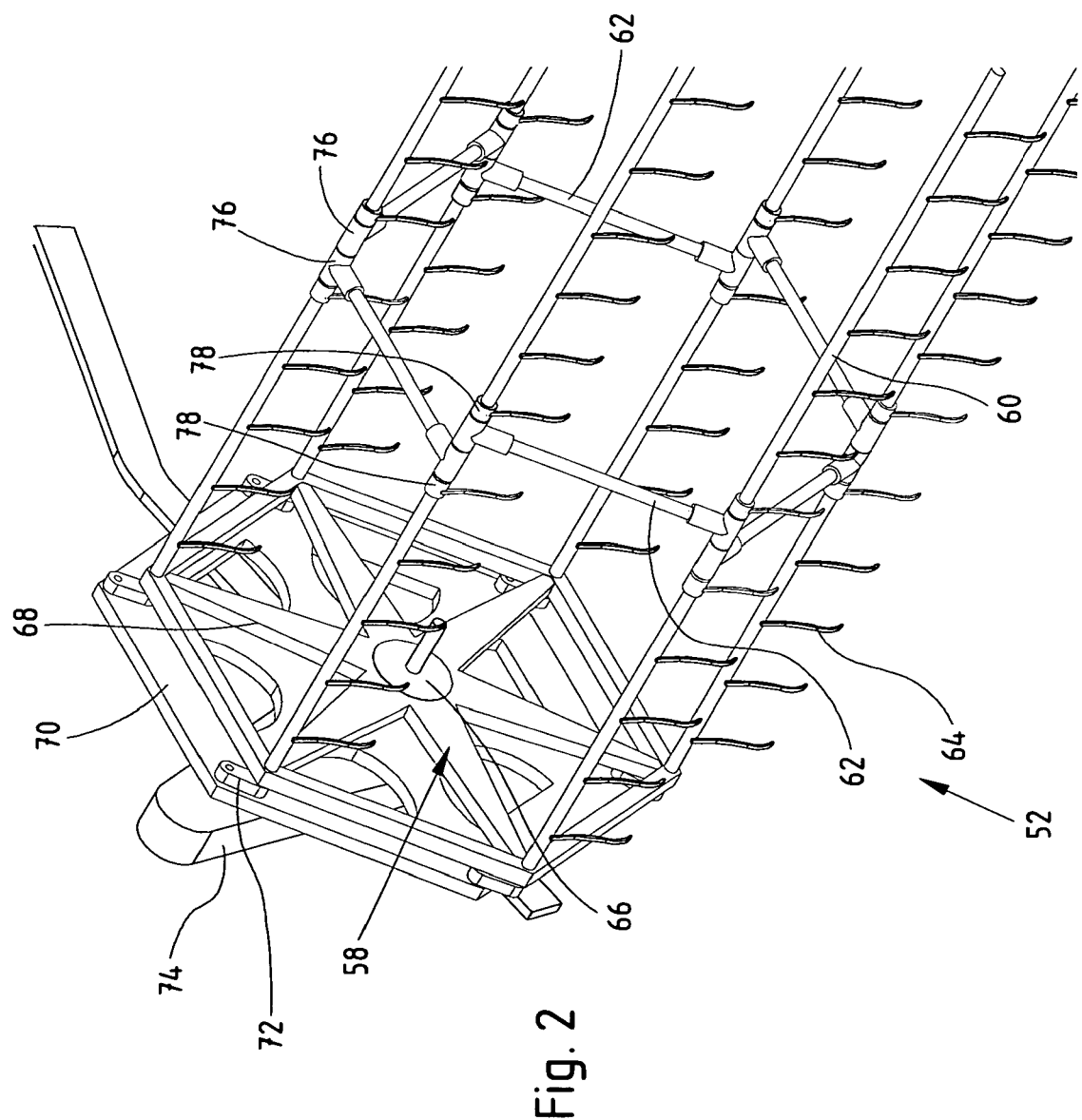
FIG. 2 is a perspective view of a reel according to the invention.

FIG. 2 shows a perspective view of the right end section of reel 52, in the direction of travel of the combine 10. Reel 52 includes a spider 58 at each end and six tine carriers 60 made of cylindrical tubes with a constant outside cross section across their length. Links 62 are arranged in a hexagon shape and tines 64 are mounted on tine carriers 60. The spiders 58 are arranged at both ends of reel 52 and each have six arms 68 extending radially outwards from a hub 66. Tine carriers 60 extend between the distal ends of arms 68 of the spiders 58 longitudinally across the entire width of reel 52. The tine carriers are either one piece or are composed of individual elements mechanically fastened together. Tine carriers 60 are rotatably seated on arms 68 and can also rotate with respect to links 62.

A disk cam 70 is arranged alongside spider 58 on the right side of reel 52, with its axis of rotation arranged eccentrically to the axis of hub 66. Tine carriers 60 are connected by control levers 72 acting as crank drives, to adjacent corners of disk cam 70. In operation, hub 66 and arms 68 of spider 58 are rotated by a motor 74. Tine carriers 60 thus carry out a rotational motion with respect to arms 68, so that the tines 64 are oriented approximately downwards over the entire rotational range of reel 52, as illustrated in FIG. 2. Thus crop material is fed to cutter bar 44 and screw conveyor 48.

Reel 52 is free of supporting elements in the interior between tine carriers 60. The hubs 66 of spiders 58 are not connected by a center carrier tube extending over the width of reel 52 or similar supporting retaining elements extending across the width, such as thin links or the like. The resultant free space has the advantage that the reel 52 of the present invention is lighter than embodiments furnished with a center carrier tube and that the view through the crop harvesting device 38 is not obstructed by the center carrier tube. The operator in cab 16 thus has a good view of cutter bar 44 and the area in front of crop harvesting device 38 during harvesting operation and through the raised reel 52 during transportation.

Links 62 are provided to reinforce reel 52, which can have a width of 6 m or more (e.g., 9 m) with the necessary stability. Links 62 only connect adjacent tine carriers 60 and constitute a honeycomb shape. Apart from links 62 and spiders 58, no other cross elements supporting tine carriers 60 are provided. Links 62 and tine carriers 60 form a latticework. The connection between links 62 and tine carriers 60 enables the tine carriers 60 to rotate about their longitudinal axes, while all other motion is restricted. Links 62 are distributed at suitable intervals across the width of reel 52.

Referring to FIG. 2, each link 62 is connected by two terminal link holders 76 to tine carriers 60. On each tine carrier 60, one link holder 76 is pointing to the preceding tine carrier 60 and the adjacent link holder is pointing to the trailing link carrier 60 and are arranged alternately on the left and the right or vice versa. Link holders 76 which enclose tine carriers 60 have a circular inside cross section and thus allows the above-described rotation of tine carriers 60. To prevent lateral displacement of link holders 76 on tine carriers 60, link holders 76 are fixed in place in the longitudinal direction of tine carriers 60. Annular holders 78, each fastened to tine carrier 60 by a tine 64, abut the outside lateral face of the link holders 76 that is not in contact with a second link holder 76. Alternatively or additionally, annular holders 78 could reach under suitable undercuts on link holders 76.

A first embodiment of a link holder 76 is illustrated in FIGS. 3–5. Each link holder includes a first support half 80 and a second support half 82, which jointly hold the end of link 60. The two support halves 80, 82 are fastened together by a hinge pin 84.

Each support half 80, 82 includes a bearing section 86 having an inside semicircular bearing surface and opposing parallel ends 92. On one side of bearing section 86, five hinge projections 88 extend radially out from the semicircular bearing surface. Holes 90 in hinge projections 88 are coaxial and parallel to the longitudinal axis of the bearing surface. On the opposite side of bearing section 86, there is a link holding section 94 extending radially to the semicircular bearing surface. Link holding section 94 includes an essentially semicircular flange 96. Each bearing half 80, 82 is preferably made of a hard, impact-resistant material which guarantees a long surface life of the bearing even without lubrication. A polyamide, such as Zytel ST 801 was successfully used.

The offset of hinge projections 88 and the arrangement of holes 90 for hinge pin 84 are designed such that the bearing surfaces oppose and face one another when two support halves 80, 82 are put together, in which case the two bearing halves 80, 82 fit together and hinge pin 84 can be inserted into hole 90, so that support halves 80, 82 are rotatably fitted together. The hinge includes hingepin 84 and holes 90. The joined bearing surfaces define an approximately cylindrical opening for tine carrier 60. The fit-together support halves 80, 82 are preferably identical to one another. It is conceivable to use a coupling other than hingepin 84 to couple support halves 80, 82 pivotably together. Thus it would be conceivable to cast the two support halves 80, 82 as a single component with a one-part flexible hinge.

The pivotable seat of the two support halves 80, 82 can be opened, positioned on tine carrier 60 and closed. Link holding section 94 of each support half 80, 82 is symmetrical about an axis running perpendicular to the bearing surface.

When support halves 80, 82 are joined together, link holding sections 94 form a cylindrical socket that is surrounded by one end of hollow cylindrical link 62. Support halves 80, 82 are fixed together by link 62 surrounding link holding sections 94. The two tine carriers 60 connected by link 62 prevent link 62 from slipping off link holding sections 94. Alternatively, link holding sections 94 on the link can be locked together by a pin that penetrates suitable holes in link 62 and link holding sections 94 (not shown), or by a flexible element on one or both link holding sections 94 that is under initial outward tension. The flexible element is arranged in an opening in the side wall of link 62 in the assembled state, corresponding to the embodiment shown in FIGS. 6 and 7.

FIGS. 6 and 7 show a second embodiment of a link holder 76 with a link 62 mounted thereon. Elements congruent with the first embodiment are marked with the same reference numbers. The second embodiment differs from the first in that the inside and outside cross section of link 92 is rectangular or square. The cross section of the link holding sections 94 is correspondingly rectangular. Thus, undesired twisting or rotational motion between link holder 76 and link 62 is avoided.

Moreover, a snap-in connection between one support half 82 and link 62 is provided. Link holding section 94 of support half 82 is provided with a springy tongue 98, cast or injection-molded on in one piece, which protrudes out from link holding section 94 so long as it is not pushed down. Tongue 98 has a ramp rising from outside to inside, i.e., towards tine carrier 60, while its side facing away from tine carrier 60 rapidly declines. Link 62 has an opening 100, into which tongue 98 extends when link 62 has reached its desired position relative to link holder 76. By pressing tongue 98 down, link 62 can be removed from link holder 76. It would of course be conceivable to furnish second support half 80 with a tongue 98 as well, which engages in a second opening in the wall of link 62 opposite from opening 100.

The link holders 76 as described are thus initially placed with one support half 80 on a tine carrier 60. The link holder 76 is closed by pivoting the hinge joint about hinge pin 84. Link 62 is slipped onto link holding sections 94, with the end face of link 62 coming into contact with the ramp of tongue 98 and pressing tongue 98 progressively inwards, i.e., towards link holding section 94 of the other support half 80. Once tongue 98 reaches opening 100, it automatically springs outwards and locks link 62 to link holder 76. For disassembly, tongue 98 is pressed inwards by hand or with a tool, so that link 62 can then be removed. Subsequently the support halves of link holder 76 can be pivoted apart. Thus, according to the present invention, reel 52 permits easy installation and removal of links 62.

Having described the illustrated embodiments, it will become apparent that various modifications can be made without departing from the scope of the invention as defined in the accompanying claims.

The invention claimed is:

1. A reel for a crop harvesting device comprising:
    a plurality of tine carriers extending across the width of the reel and carrying tines for feeding crop;
    a plurality of links for supporting the tine carriers;
    link holders for fastening the links to the tine carriers, each link holder comprising two support halves that are pivotable with respect to one another and that enclose one of the plurality of tine carriers between them, each of the support halves having a link holding section and the link holding sections of the two support halves are jointly enclosed by the link so that the support halves are fixed together by the link.

2. The reel according to claim 1 wherein each link is locked to a respective link holder.

3. The reel according to claim 1 wherein each link has an opening in which an elastic tongue of one link holding section is engaged in an installed state.

4. The reel according to claim 1 wherein an inside cross section of the link and the outside cross section of the link holding sections are not circular.

5. The reel according to claim 1 wherein the tine carriers are pivotably seated and are pivoted by pivot drives, and wherein the pivot drives are control levers.

6. The reel according to claim 1 wherein the link holder is secured against axial displacement along the tine carrier.

7. The reel according to claim 1 wherein each link holder locks only one link.

8. The reel according to claim 1 wherein the link connects two adjacent tine carriers to one another.

9. The reel according to claim 1 wherein the support halves are pivotably joined together on their side opposite the link holding sections by a hinge.

10. A crop harvesting device having a reel without a center carrier tube comprising:
    a plurality of tine carriers extending across the width of the reel and carrying tines for feeding crop;
    a plurality of links for supporting the tine carriers;
    link holders for fastening the links to the tine carriers, each link holder comprising two support halves that are movable with respect to one another and that enclose one of the plurality of tine carriers between them, each of the support halves having a link holding section and the link holding sections of the two support halves are jointly enclosed by the link so that the support halves are locked together by the link.

\* \* \* \* \*